United States Patent [19]

Court

[11] Patent Number: 5,060,417

[45] Date of Patent: Oct. 29, 1991

[54] FLOWER STEM AND HEAD SUPPORT APPARATUS

[76] Inventor: Edward H. Court, 314 Kingsbury Grade, Stateline, Lake Tahoe, Nev. 89449

[21] Appl. No.: 426,976

[22] Filed: Oct. 25, 1989

[51] Int. Cl.$^5$ .............................................. A01G 5/00
[52] U.S. Cl. .................................. 47/41.15; 47/41.01; 47/41.13; 248/278; 248/683
[58] Field of Search ....................... 47/41.1, 41.05, 41, 47/41.11, 41.13, 41.15, 41.14, 41.12, 84; 248/27.8, 683; 206/423

[56] References Cited

U.S. PATENT DOCUMENTS

| | | | |
|---|---|---|---|
| 533,644 | 2/1895 | Hell | 47/41.13 X |
| 2,273,368 | 2/1942 | Mumford | 47/41.13 X |
| 2,486,109 | 8/1949 | Brutocao et al. | 248/27.8 |
| 3,177,108 | 4/1965 | Waszkiewicz | 47/41.87 X |
| 3,474,568 | 9/1969 | Gallo | 248/27.8 |
| 3,928,934 | 12/1975 | Wollen | 47/41.15 |

FOREIGN PATENT DOCUMENTS

| | | | |
|---|---|---|---|
| 660650 | 2/1929 | France | 47/41.11 |
| 22224 | 6/1910 | United Kingdom | 47/41.11 |
| 23881 | 10/1911 | United Kingdom | 47/41.11 |

Primary Examiner—David A. Scherbel
Assistant Examiner—Linda J. Watson
Attorney, Agent, or Firm—Workman, Nydegger & Jensen

[57] ABSTRACT

An apparatus for extending the useful life of cut flowers and promoting a maximum bloom by supporting the head of the flower and preventing the head from drooping. Embodiments of the present invention include tubular structures for gripping the outer surface of the flower stem below the flower receptacle. A slot or slit is formed along the length of the tubular member. The slot widens to allow the stem to pass therethrough to the interior of the tubular member where the stem is snugly gripped. Also included is a cup-like structure adapted to hold and support the flower receptacle. The embodiments of the present invention may be economically fabricated and easily installed on cut flowers.

22 Claims, 3 Drawing Sheets

FLOWER STEM AND HEAD SUPPORT APPARATUS

BACKGROUND

1. The Field of the Invention

The present invention relates generally to apparatus used in the floriculture industry. More particularly, the present invention relates to devices used to support the stems and heads of cut flowers.

2. The Background Art

The floriculture industry, meaning the industry involved in the cultivating and marketing of flowers, is a multi-billion dollar industry world-wide. In the United States alone, sales of roses has greatly exceeded one-half billion dollars recently with projections showing that one billion dollars in annual sales of roses will occur within the foreseeable future. With the addition of sales of flowers other than roses, it will be appreciated that the floriculture industry is a significant section of many economies of the world.

Cut flowers represent a large percentage of the total sales in the floriculture industry. Many of the sales of cut flowers are through retail florist establishments. In such establishments, a customer often purchases a dozen carnations, roses, or other flowers which have been cut at some point near the bottom of the stem. The stem usually holds a single flower head, most often in the form of a closed bud which will bloom within a day or so after purchase. After being cut and while still at the florist establishment, cut flowers are generally kept under conditions as close as possible to the ideal conditions of cool temperatures and ample moisture.

To the disappointment of the purchaser of cut flowers, for example a dozen long stem roses, it is often the case that the flowers begin to expire only a few days after leaving the retail floral establishment. Many customers' experience with an expensive bouquet of a dozen roses wilting and expiring within only a couple or a few days after the purchase acts as a disincentive to the purchase of expensive flowers and, at a minimum, diminishes the customer's enjoyment of the beauty of the flowers.

Even though many techniques have been suggested for preserving flowers such as roses, and techniques have even been proposed for reviving wilted roses, the purchaser often is unaware, or is unwilling, to take such preserving or reviving measures. For example, properly trimming the stem, keeping the stem in water which includes a preservative mixture, and placing the cut flowers in a cool location away from exposure to direct sunlight, all help to maintain the beauty of cut flowers Still, in spite of all such measures, the heads of roses and other cut flowers often droop or wilt shortly after being cut or leaving the retail florist establishment.

The drooping or wilting of the flower head is both unsightly and hastens the complete expiration of the flower. Once the stem bends at a point somewhere below the head, thus causing the head to droop, the passage of water up through the stem is blocked and the flower petals will shortly discolor and the flower will be discarded. Once a flower head has drooped, revival may be possible. If revival measures fail, an experienced flower arranger might use a small gauge wire which is forced down through the head of the flower into the first section of the stem to raise the head.

Unfortunately, placing a wire into the head and stem of a flower itself has a detrimental effect on the flower. Often the interaction of the metal wire and the botanical fluids will create acids which will drastically shorten the useful life of a cut flower. Also, the insertion of a wire into the flower necessarily destroys part of the internal structure of the flower and may restrict its ability to transport water and nutrients to the flower head. Moreover, once a wire has been inserted into the flower head, the head will seldom open into a full bloom. Thus, the described measure has been generally limited for use as a revival measure and have not been utilized to preserve flowers such as roses.

Other efforts have also been made in the art to prevent, or revive, drooping flower heads. Such efforts include wires which are attached to the exterior of the flower stem, sheets of stiff material which are wrapped around the flower stem, as well as some configuration of tubes which extend the length of the flower stem. Such past efforts have been unacceptable due to, among other things, their ineffectiveness or their unsightliness when installed on a flower.

Moreover, such efforts often result in support being placed too low on the stem resulting in inadequate support of the flower head and the portion of the stem immediately below the head. With inadequate support immediately below the flower head, drooping occurs even with the presence of a support device.

In view of the difficulty which has been experienced in the art, it would be an advancement in the art to provide an apparatus which will extend the useful life of cut flowers. It would also be an advance in the art to provide an apparatus which can be used to straighten drooped heads of flowers. It would be a still further advance in the art to provide an apparatus to prevent drooping of flower heads which has no detrimental effect on the flower and which may be efficiently applied to a flower whose head has not drooped.

It would be a further advance in the art to provide an apparatus for preventing the drooping of flower heads which may be easily applied to the flower and is economically used in view of the cost of the flower. It would also be an advance in the art to provide an apparatus to prevent the drooping of flower heads which does not detract from the beauty of the flower when installed. It would be still another advance in the art to provide an apparatus which can be installed on cut flowers of many different species to extend the useful life of the flowers, prevent the flower heads from drooping, and promote the largest possible bloom.

BRIEF SUMMARY AND OBJECTS OF THE INVENTION

The present invention provides a novel apparatus for extending the useful life of cut flowers and promoting a maximum bloom. The embodiments of the present invention support the head of the flower preventing the head from drooping.

In accordance with the present invention, the bending of the stem in the area anywhere within about 2 inches from the bottom of the flower receptacle is a most likely reason for premature expiration of well cared for cut flowers. The bending of the stem, commonly referred to as wilting or drooping of the flower head, blocks the transportation of water and nutrients up the stem to the flower head causing premature discoloration, wilting, and dropping of petals.

Embodiments of the present invention include means for gripping the outer surface of the flower stem. Such structures may include tubular or cylindrical members or structures performing equivalent functions. Preferably, the means for gripping is flexible so that it can accommodate a range of stem diameters. Elongated tubular members having lengths and diameters to accommodate a range of stem sizes may function as a means for gripping.

In order to facilitate placing the apparatus on the flower, means for forming an opening along the length of the tubular or cylindrical members is provided. The opening is preferable a slot or a slit. The structures providing the gripping function are preferably a flexible material which allows the stem of the flower to be gripped firmly but gently so as to not cause any damage.

The apparatus is preferably fabricated from a flexible material so that the slot may be widened to allow the stem to be slipped through the slot and the apparatus installed. The cross sectional diameter of a tubular member is desirably such that a variety of stems having a range of diameters may be snugly gripped therein.

Embodiments of the present invention may also include a means for receiving and supporting the flower receptacle. In the described embodiment the means for receiving and supporting the receptacle at the base of a flower is a cup-like structure. The cup-like structure is adapted to hold the flower receptacle and preferably be expandable to allow different sizes of receptacles to be received therein. The described embodiment longitudinal slits which allow the structure to expand.

The embodiments of the present invention may also include a means for stabilizing the structure on the stem. Various textures formed on the stem gripping surface protrude into the space occupied by the stem and function to stabilize the apparatus on the stem. Also, since the appearance of the apparatus has important aesthetic qualities, the apparatus may be transparent, translucent, or opaque, and may be fabricated with or without the addition of color.

In view of the forgoing, it is a primary object of the present invention to provide an apparatus to extend the useful life of cut flowers.

It is also an object of the present invention to provide a floral apparatus to prevent the drooping of flower heads.

It is a further object of the present invention to provide an apparatus to straighten drooped heads of flowers.

It is a still further object of the present invention to provide an apparatus for preventing the heads of cut flowers from drooping which is easily applied to the flower and which is economical in view of the cost of the flower.

It is yet another object of the present invention to provide an apparatus which can be installed on cut flowers of many different species.

These and other objects and features of the present invention will become more fully apparent from the following description and the appended claims taken in conjunction with the accompanying drawings.

DETAILED DESCRIPTION OF THE PREFERRED EMBODIMENTS

Reference will now be made to the drawings wherein like parts are designated with like numerals throughout. It will be appreciated that the described embodiment has particular application with cut flowers belonging to the genus Rosa and will be described using examples from that genus. Nevertheless, the present invention has application with cut flowers belonging to different genera as well as a variety of other flowering plants.

Figure 1:
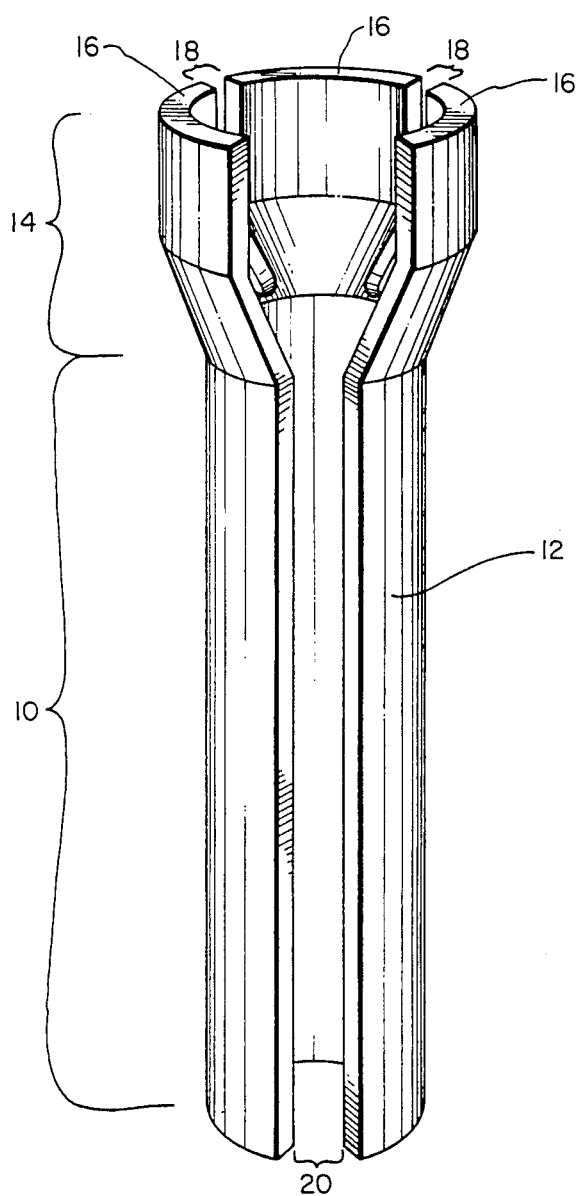
FIG. 1 is an elevational view of a first presently preferred embodiment of the present invention.

Referring first to FIG. 1, an elevational view of a first presently preferred embodiment of the present invention is provided The principal structures of the embodiment illustrated in FIG. 1 are generally indicated by brackets.

Generally indicated in FIG. 1 is a gripping member 10. The function of the gripping member 10 is to snugly grip the stem of the flower.

Gripping member 10 illustrated in FIG. 1 is one example of a gripping means which may be included in the present invention. Gripping member 10 comprises a generally cylindrical gripping member body 12 which is suitable for most applications of the present invention. The gripping means of the present invention, however, may comprise other body shapes which are generally tubular in nature. Furthermore, it is not necessary that gripping member body 12 be symmetrically cylindrical or tubular but structures of other shapes which perform the same or equivalent functions are also to be included within the scope of the gripping means of the present invention.

Examples of additional shapes which gripping member 10 may assume are tubular shapes having cross-sectional forms which are rectangular, hexongonal, or triangular. Importantly, the gripping member must fit the stem of the flower to be able to support the weight of the flower head and to keep the flower head in its proper position.

It will be appreciated that equivalent structures may be used as alternatives to those illustrated herein. For example, gripping body 12 may also comprise a plurality of apertures or only a frame-like structure. Significantly, structures performing the same or equivalent functions to the illustrated structure are intended to be included within the scope of the gripping means.

Also generally designated in FIG. 1 is receiving member 14 which functions as the means for receiving and supporting a flower head in the illustrated embodiment. The receiving member in FIG. 1 comprises three receiving member sections 16. The receiving member is adapted to receive and support the receptacle of the flower. The receptacle of the flower is herein defined as that portion of the plant where the flower petals are attached to the stem as will be illustrated shortly.

In the illustrated embodiment, receiving member 14 has a cup-like shape into which the flower receptacle, located at the base of the flower head, is received. The receiving member functions to support the receptacle of the flower head and assists with keeping the flower head from drooping. It will be appreciated that structures other than those illustrated herein but performing the same or equivalent functions may serve as a receiving means within the scope of the present invention.

As shown in FIG. 1, both gripping member 10 and receiving member 14 are provided with a slot, designated by bracket 20. Slot 20 allows the stem to be slid into the interior of gripping member 10 and receiving member 12. Slot 12 is one example of a means for forming an opening along the length of the tubular gripping member 12. Importantly, other structures may be utilized to perform the same or equivalent functions as slot 20. For example, embodiments of the present invention may incorporate a clamping or adhesive arrangement. The illustrated structures, however, are preferred for use with cut flowers such as roses.

Gripping member 10 and receiving member 12 are fabricated so that they are resilient and slot 20 may be widened to allow passage of the flower stem and, upon the stem resting within the interior of the gripping member, gripping member 20 will snugly grip the stem placed therein.

Figure 2:
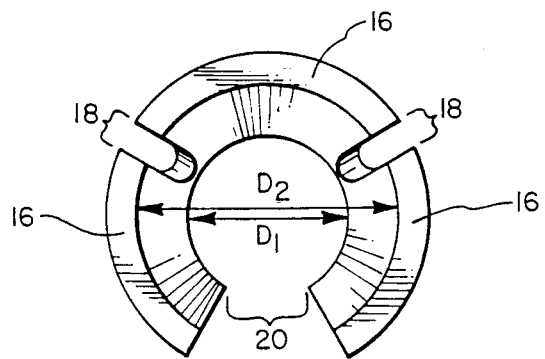
FIG. 2 is a top view of the embodiment illustrated in FIG. 1.

As illustrated in FIGS. 1 and 2, slits 18 are formed between receiving member sections 16 allow the receiving member to expand. As a flower, such as a rose, blooms the receptacle of the flower will expand. Slits 18 allow the receiving member 14 to commensurately expand with the flower receptacle and continue to provide support for the flower head. Gripping member 10 also is capable of expanding to accommodate the changing diameter of a stem as the stem swells and shrinks.

Gripping member body 12 is preferably fabricated from a polymer material which allows the illustrated structure to resist bending along its length but allows the embodiment to be resiliently flexible about its circumference so that slot 20 may be widened for passage of the stem therethrough but, upon placing the stem within the gripping member, the inner surface of the gripping member grips the stem.

The embodiments illustrated in the figures may be fabricated using polymer materials and injection molding techniques known to those skilled in such arts. Since it is important that the appearance of the embodiments not detract from the beauty of the flower the apparatus is attached to, the color or lack of color of the finished apparatus is chosen to make the embodiment least noticeable. For example, in some cases it may be best to use polymer materials which will render the embodiments transparent or translucent. In other cases, it may be best to use dyes which will color the embodiments green or some other color.

Due to the structure and material used in the embodiment illustrated in FIG. 1 and 2, a particular embodiment of the present invention can accommodate flowers of several different species and/or sizes. Generally, it is desirable that the length of gripping member 10 and receiving member 14, in combination, be at least one inch. However, this length may be greater or shorter according to the needs of the particular application.

FIG. 2 shows a top view of the embodiment illustrated in FIG. 1. While the inner diameters of gripping member 10 and receiving member 14 may vary according to the particular application of the embodiment, the inner diameter of the gripping member, designated at $D_1$, preferably may be in the range from about 0.04 inches to about 0.4 inches. The inner diameter of receiving member 14, designated at $D_2$, preferably may be in the range from about 0.08 inches to about 0.8 inches.

Figure 3:
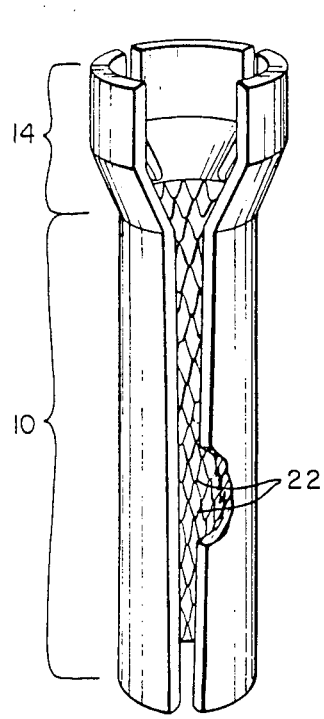
FIG. 3 is an elevational view of a second presently preferred embodiment of the present invention.
Figure 4:
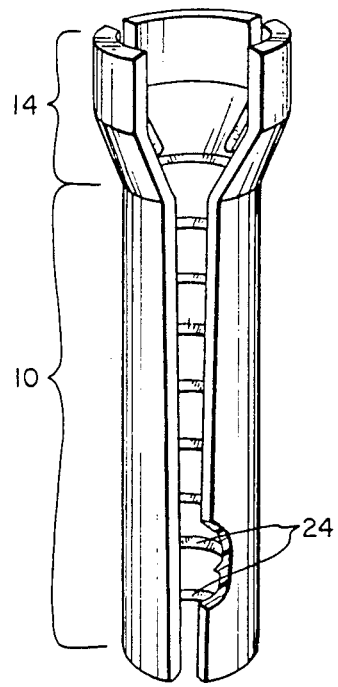
FIG. 4 is an elevational view of a third presently preferred embodiment of the present invention.
Figure 5:
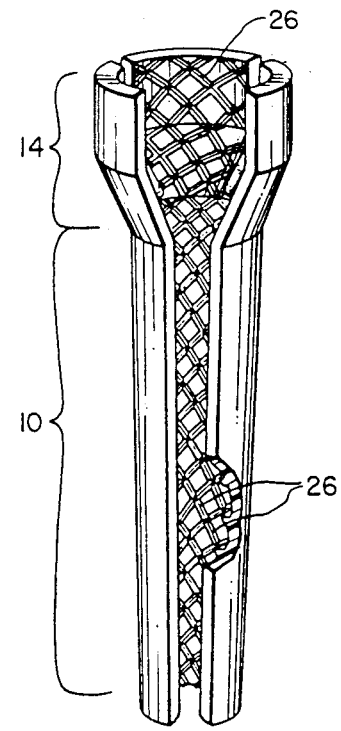
FIG. 5 is an elevational view of a fourth presently preferred embodiment of the present invention.

Illustrated in FIGS. 3–5 are second, third, and fourth presently preferred embodiments, respectively, of the present invention. Each of the embodiments illustrated in FIGS. 3–5 includes a treatment on the inner surface of gripping members 10 and/or receiving members 14. The treatment on these inner surfaces are examples of structures capable of functioning as a means for stabilizing the gripping member on the flower stem.

It will be appreciated that the stems of cut flowers are often smooth and in many cases slippery. By forming a friction enhancing surface on the inner diameter of gripping member 10 and/or receiving member 14 these structures will remain in their proper places and better perform their functions.

The second embodiment of the present invention illustrated in FIG. 3 is substantially similar to the first embodiment illustrated in FIG. 1 with the addition of a "fish scale" texture 22 on the interior of gripping member 10. The nature of the fish scale texture is that it allows gripping member 10 to be easily slid up the flower stem but will resist sliding down the flower stem thus stabilizing the gripping member on the stem.

The third embodiment of the present invention illustrated in FIG. 4 is substantially similar to the first embodiment illustrated in FIG. 1 with the addition of a plurality of annular rings 24 on the interior of gripping member 10. Annular rings 24 protrude inwardly toward the center of the gripping member and serve to stabilize the gripping member on the stem.

The fourth embodiment of the present invention illustrated in FIG. 5 includes a raised knurled surface on the inner circumferences of gripping member 10 and receiving member 14. The raised knurled surface 26 on gripping member 10 helps to stabilize the gripping member in position on the stem. The raised knurled surface 26 on receiving member 14 provides better gripping of the flower receptacle. As the receptacle the base of the flowers expands, the tissues of the receptacle will engage the raised knurled texture thus providing better support for the flower head as it blooms.

The fourth embodiment illustrated in FIG. 5 also includes gripping member 10 which has a slight taper. The taper of the gripping member is such that the inner circumference of the gripping member is less at the lower end than at the end where the receiving member is attached. The tapered gripping member may be incorporated into embodiments where it will assist in holding the gripping member in position on the stem.

Figure 6:
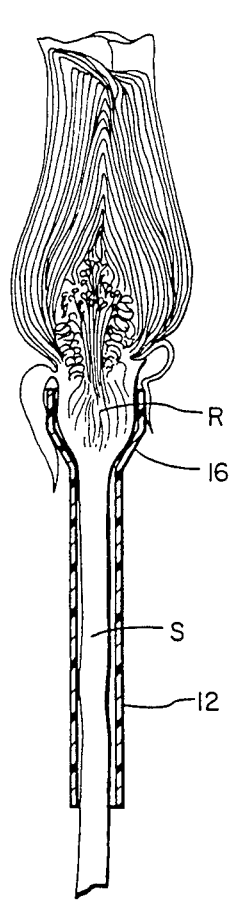
FIG. 6 is a cross sectional view of an embodiment of the present invention installed on a cut flower prior to blooming.
Figure 7:
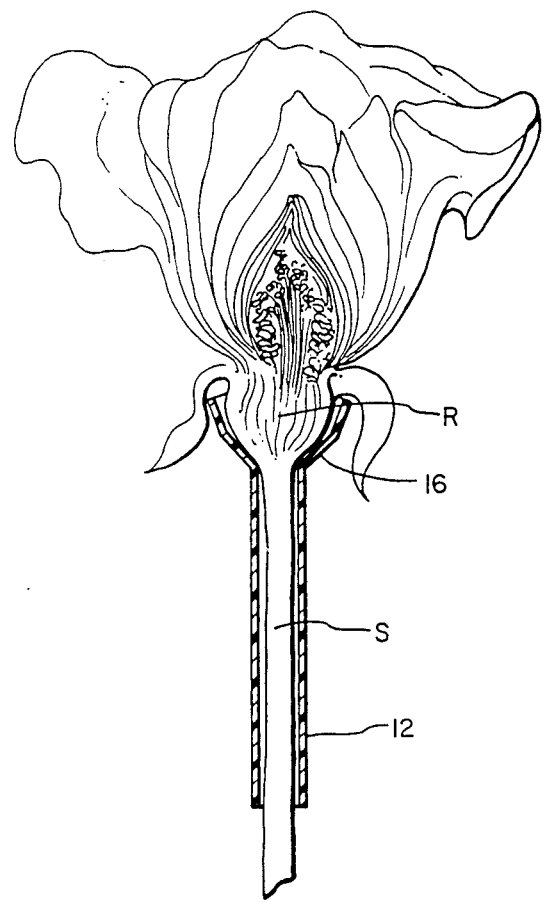
FIG. 7 is a cross sectional view of an embodiment of the present invention installed on a cut flower which has bloomed.

Represented in FIGS. 6 and 7 is a cross-sectional view of a flower head and stem (belonging to the genus Rosa) with an embodiment of the present invention installed thereon. In FIG. 6, the gripping member body 12 is shown installed on a stem, designated S, while the receptacle of the flower, designated R, is resting within the cup-like shape formed by receiving member sections 16.

In FIG. 7, the flower head has bloomed and the expansion of receptacle R and the corresponding flexing of receiving member sections 16 can also be seen. Gripping member body 12 continues to grip stem S and provides support for the stem and flower head as blooming occurs. With the stem and head properly supported, water and nutrients are able to be transported up the stem to the head thus promoting the largest possible bloom and maximum useful life of the flower.

Figure 8:
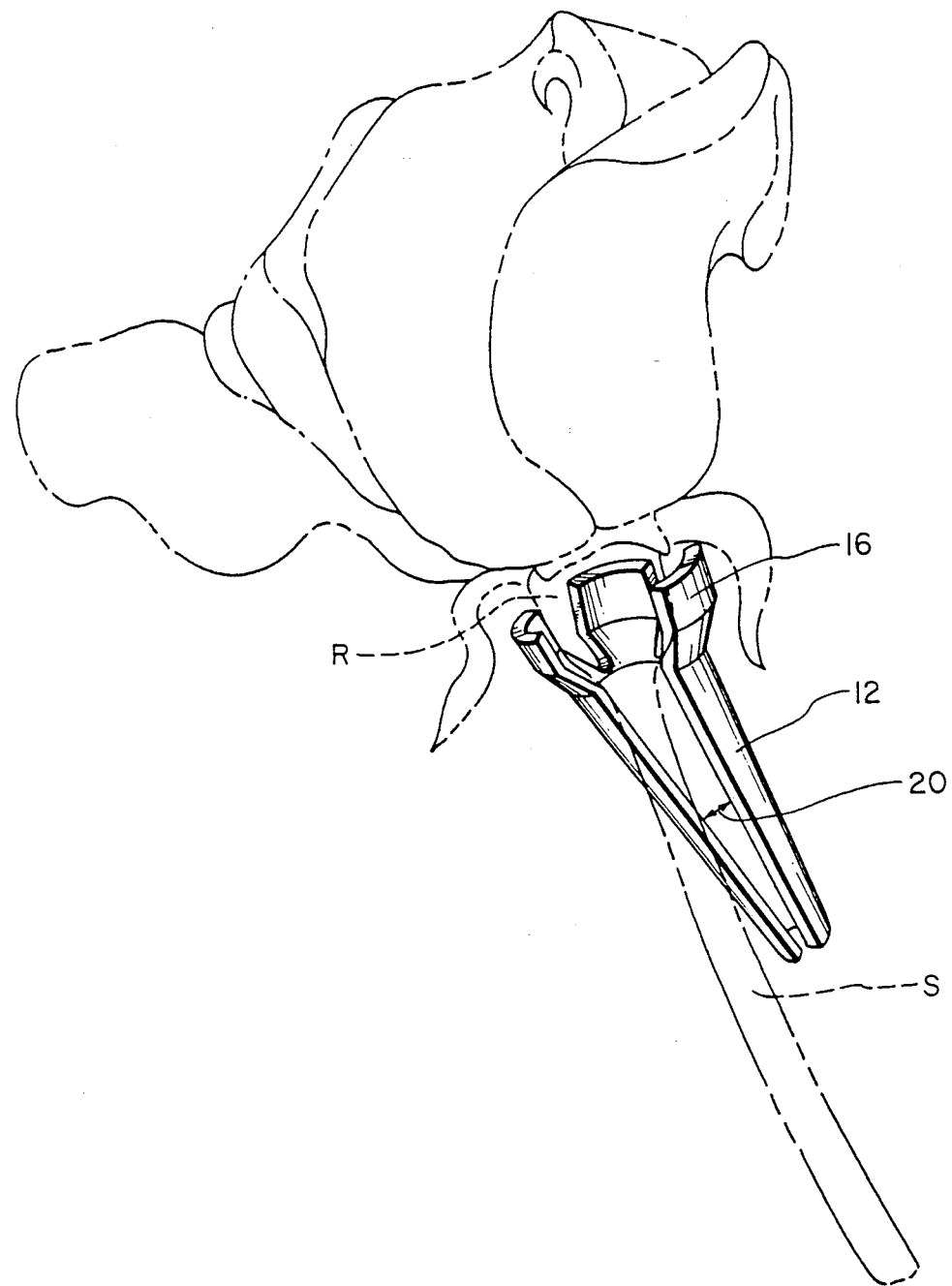
FIG. 8 is a perspective view of an embodiment of the present invention being installed on a cut flower.

Provided in FIG. 8 is a perspective view of a flower head and stem shown in phantom image and an embodiment of the present invention being installed thereon. As can be seen in FIG. 8, slot 20 expands to allow stem S to pass therethrough. Receptacle R is received into the cup-like shape formed by receiving member sections 16 which flex to accommodate receptacle R. After the stem and receptacle has been placed in the appropriate structures the embodiment snugly grips the stem and supports the receptacle.

Use of the present invention dramatically improves the useful life of cut flowers. When used with some species of roses, the useful life of the cut flowers generally doubles from usually less than two weeks without the use of embodiments of the present invention to nearly a month with the use of the present invention and proper care of the flowers. Moreover, use of the present invention promotes the maximum possible size blooms from the flower. Significantly, the present invention provides advantages not heretofore available in the art without unduly detracting from the appearance of the flower.

Furthermore, embodiments of the present invention may be used to extend the useful life of cut flowers by preventing the drooping, or straightening already drooped, heads of flowers. Moreover, embodiments of the present invention may be easily and quickly installed and single embodiments of the present invention may be used with a variety of different species and sizes of flowers. Still further, embodiments of the present invention may be fabricated inexpensively enough compared to the cost of the flowers so as to be considered disposable.

It will be appreciated that the apparatus of the present invention are capable of being incorporated in the form of a variety of embodiments, only a few of which have been illustrated and described above. The invention may thus be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. An apparatus for supporting the stem of a flower comprising:
    an elongated tubular member dimensional such that the stem of a flower fits longitudinally within the elongated tubular member, the elongated tubular member having a first end;
    means for forming an opening along the longitudinal length of the elongated tubular member, the opening allowing the cross-sectional area of the elongated tubular member to be increased to accommodate placing the stem through the opening to the interior surface of the elongated tubular member and such that at least a portion of the stem is snugly gripped by the elongated tubular member once placed therein, the elongated tubular member adapted for supporting the stem adjacent to the flower head; and
    a flared portion provided at the first end of the elongated tubular member for receiving the flower calyx.

2. An apparatus for supporting the stem of a flower as defined in claim 1 wherein the elongated tubular member comprises a substantially cylindrical member.

3. An apparatus for supporting the stem of a flower as defined in claim 1 wherein the flared portion is provided with at least one longitudinal slot.

4. An apparatus for supporting the stem of a flower as defined in claim 1 wherein the means for forming an opening comprises a slot formed along the length of the elongated tubular member.

5. An apparatus for supporting the stem of a flower as defined in claim 4 wherein the slot extends the entire length of the elongated tubular member.

6. An apparatus for supporting the stem of a flower as defined in claim 4 wherein the width of the longitudinal slot, prior t being flexibly expanded, is at least 10 percent of the external perimeter of the elongated tubular member.

7. An apparatus for supporting the stem of a flower as defined in claim 1 wherein the elongated tubular member comprises a polymeric material.

8. An apparatus for supporting the stem of a flower as defined in claim 7 wherein the polymeric material is translucent.

9. An apparatus for supporting the stem of a flower as defined in claim 7 wherein the polymeric material is green in color.

10. An apparatus for supporting the stem of a flower as defined in claim 1 wherein the interior perimeter of the elongated tubular member comprises means for stabilizing the elongated tubular member on the stem.

11. An apparatus for supporting the stem of a flower as defined in claim 10 wherein the means for stabilizing comprises at least one protrusion formed on the inner surface of the elongated tubular member projecting inwardly into the space occupied by the flower stem.

12. An apparatus for supporting the stem of a flower as defined in claim 1 wherein the elongated tubular member is at least one inch long.

13. An apparatus for supporting the stem of a flower as defined in claim 1 wherein the inner cross-sectional diameter of the elongated tubular member is in the range from about 0.04 to about 0.4 of an inch.

14. An apparatus for supporting the stem of a flower as defined in claim 1 wherein the flower comprises a rose.

15. An apparatus for supporting the stem of a flower as defined in claim 1, wherein the flared portion comprises a plurality of longitudinal slits allowing the flared portion to expand.

16. An apparatus for supporting the stem of a flower as defined in claim 1 wherein the flower is a member of the genus Rosa.

17. A support for the stem of a flowering plant comprising:
    a) a substantially cylindrical member with first and second and having an inner diameter in the range from about 0.04 inches to about 0.4 inches and an outer diameter the length of the cylindrical member being at least five times as great as its inner diameter;
    b) a slot formed along the entire length of the cylindrical member, the slot adapted for allowing a stem to pass therethrough, the cylindrical member being fabricated from a material allowing the width of the slot to be increased to allow the passage of stems having diameters greater than the width of the slot and such that the inner circumference of the cylindrical member will grip at least a portion of the circumference of the stem after the stem has been placed within the inner circumference; and c) a cup-shaped receiving member positioned at the first end of the cylindrical member, the receiving member having a plurality of longitudinal slits, one of said slits joining with the slot, the receiving member being adapted for receiving the calyx, the cylindrical member, and the receiving member cooperating to support the stem immediately below the flower head and to prevent the flower head from drooping.

18. A support for the stem of a flowering plant as defined in claim 17 wherein the interior perimeter of the cylindrical member comprises means for stabilizing the cylindrical member in position on the stem.

19. A support for the stem of a flowering plant as defined in claim 18 wherein the means for stabilizing comprises at least one protrusion extending from the inner circumference of the cylindrical member inwardly into the space occupied by the flower stem.

20. An apparatus for supporting the stem of a flower as defined in claim 17 wherein the cylindrical member comprises a polymeric material.

21. An apparatus for supporting the stem of a flower as defined in claim 20 wherein the polymeric material is translucent.

22. An apparatus for supporting the stem of a flower as defined in claim 20 wherein apparatus is green.

* * * * *

UNITED STATES PATENT AND TRADEMARK OFFICE
CERTIFICATE OF CORRECTION

PATENT NO. : 5,060,417

DATED : October 29, 1991

INVENTOR(S) : EDWARD H. COURT

It is certified that error appears in the above-identified patent and that said Letters Patent is hereby corrected as shown below:

```
Column 1, line 38, after "couple" insert --of hours--
Column 1, line 41, "customer's enjoyment" should be
--customers' enjoyment--
Column 1, line 51, after "flowers" insert --.--
Column 1, line 54, after "or" insert --shortly after--
Column 1, line 60, after "shortly" insert --thereafter--
Column 2, line 9, "have" should be --has--
Column 3, line 16, after "and" insert --to allow--
Column 3, line 27, after "embodiment" insert --includes a cup-like
structure having a plurality of--
Column 3, line 38, "forgoing" should be --foregoing--
Column 4, line 24, after "provided" insert --.--
Column 4, line 45, "hexongonal" should be --hexagonal--
Column 5, line 26, after "16" insert --and--
Column 6, line 12, after "cases" insert --are--
Column 6, line 15, after "and" insert --will--
Column 8, lines 56-57, after "with first and second" insert
--ends--
Column 10, line 15, after "wherein" insert --the--
```

Signed and Sealed this

Thirty-first Day of August, 1993

*Attest:*

BRUCE LEHMAN

*Attesting Officer*  *Commissioner of Patents and Trademarks*